United States Patent [19]

Kennedy

[11] Patent Number: 4,924,569
[45] Date of Patent: May 15, 1990

[54] METHOD OF REPAIRING A LEAKING COOLING COIL-TO-EXPANSION VALVE COUPLING USING A CLAMP-ON NUT

[76] Inventor: Richard Kennedy, 954 Goodlette Rd., Apt. B-323, Naples, Fla. 33940

[21] Appl. No.: 941,705

[22] Filed: Dec. 15, 1986

[51] Int. Cl.$^5$ .............................................. F16L 19/00
[52] U.S. Cl. .................................. 29/890.14; 285/387
[58] Field of Search ...................... 285/387; 29/157 R

[56] References Cited

U.S. PATENT DOCUMENTS

| | | | |
|---|---|---|---|
| 260,968 | 7/1882 | Frey | 285/387 X |
| 609,509 | 8/1898 | Jensen | 285/387 |
| 625,448 | 5/1899 | Jaenichen | 285/373 X |
| 1,082,993 | 12/1913 | Beattie | 411/433 |
| 1,305,009 | 5/1919 | Robertson | 285/89 |
| 2,013,293 | 9/1935 | Snell et al. | 285/387 X |
| 2,631,209 | 3/1953 | Fortney | 285/47 X |
| 3,181,896 | 5/1965 | Russell | 285/15 |
| 3,515,415 | 6/1970 | Clark et al. | 285/387 X |
| 3,689,110 | 9/1972 | Ferguson | 285/15 |
| 4,226,164 | 10/1980 | Carter | 285/387 X |
| 4,258,944 | 3/1981 | Wendel | 285/342 |

Primary Examiner—Thomas F. Callaghan
Attorney, Agent, or Firm—Merrill N. Johnson

[57] ABSTRACT

A method of repairing a leaking coupling between an air conditioning cooling coil and its associated expansion valve using a split clamp-on coupling nut. The nut consists of two mirror-image halves, the two halves being joined together by a pair of screws. The joined together halves provide a passageway sized and partially threaded to accommodate the flanged end of the cooling coil pipe and the threaded end of the expansion valve pipe when these two pipes are aligned along a common axis and the end of the expansion valve pipe abuts against the flange of the cooling coil pipe.

1 Claim, 1 Drawing Sheet

METHOD OF REPAIRING A LEAKING COOLING COIL-TO-EXPANSION VALVE COUPLING USING A CLAMP-ON NUT

BACKGROUND AND SUMMARY OF THE INVENTION

My invention is a unique nut for repairing the leaking connection between an automobile air conditioning cooling coil and its expansion valve.

Many automobile air conditioning units on the road today as well as air conditioning units being manufactured include an evaporator or cooling coil which is connected to the unit's expansion valve by a steel nut. The nut is irremovably joined to the cooling coil by an annularly flanged pipe.

As the air conditioning unit is assembled in the automobile, a gasket is placed over the end of the coil's flanged pipe and the steel nut is pushed against the flange on the pipe and threaded over the male thread on the pipe leading into the expansion valve. As the end of the expansion valve's pipe fits over the gasket and contacts the cooling coil pipe's annular flange, a leak-proof connection is established between the cooling coil and the expansion valve.

During normal operation of the automobile's air conditioning unit, the connection between the cooling coil and the expansion valve is subject to periods of extreme cold which causes condensation of moisture and formation of ice on all surfaces of the steel coupling nut. The alternate freezing and drying of the nut causes rust to form on the threads and other surfaces of the nut until the connection is no longer leakproof. Eventually the air conditioning system loses pressure, and the system fails to operate.

Since the faulty rusted nut cannot be replaced by a similar new nut due to the annular flange on the cooling coil pipe, the system can be made operative only by disconnecting the entire cooling coil from the system and replacing it with a brand new cooling coil and its irremovable new nut. The cost in materials and labor for this conventional repair runs several hundred dollars.

My invention provides a new method of repairing an air conditioning system embodying an irremovable nut on the cooling coil by use of a unique clamp-on coupling nut.

My coupling nut is preferably formed from single piece of brass or bronze. The main body portion of the nut has a flat front face and essentially square sides. Opposite the nut's front face is a hexagonal shank. An axially bored cylindrical passageway extends through the hexagonal shank and opens into a larger cylindrical passageway through the main body of the nut. This passageway is threaded to accomodate the male threaded end of the air conditioner's expansion valve pipe.

The diameter of the cylindrical passageway in the nut's shank is sized to snugly fit around the cooling coil's pipe and the joinder between the shank's passageway and the larger passageway in the main body of the nut is smoothly curved to conform to the surface of the annular flange on the cooling coil.

Two holes are bored, threaded and countersunk in the main body of the nut running perpendicular to the passageways through the nut on opposite sides of the passageway in the main body. Then the nut is cut in two along a line passing through the center line of the passageways through the nut, creating two mirror-image halves.

My inventive method of repairing an air conditioning system which has failed because of a leaking coupling nut comprises cutting off the failed rusty steel nut and removing it from the ends of the cooling coil pipe and the expansion valve pipe. Then with the gasket in place over the end of the cooling coil pipe and the end of the expansion valve pipe pressed against the flange on the cooling coil pipe, the two halves of the coupling nut are placed around the abutting ends of the pipes and the two halves firmly joined together by two Allen head screws inserted into the two countersunk holes in the main body of the nut. The joinder between the two pipes can be made more secure by turning the coupling nut by use of a wrench on the hexagonal shank of the nut.

The clamped together coupling nut thus provides a secure leak-proof seal between the cooling coil and the expansion valve which does not malfunction in use and which, being made of non-ferrous material, will not corrode and eventually fail as is very often the case with the original steel clamping nut.

DESCRIPTION OF THE DRAWINGS

The objectives and advantages of my invention will be fully seen from the following detailed description of a preferred embodiment in conjunction with the drawings in which.

DETAILED DESCRIPTION OF A PREFERRED EMBODIMENT

Figure 1:
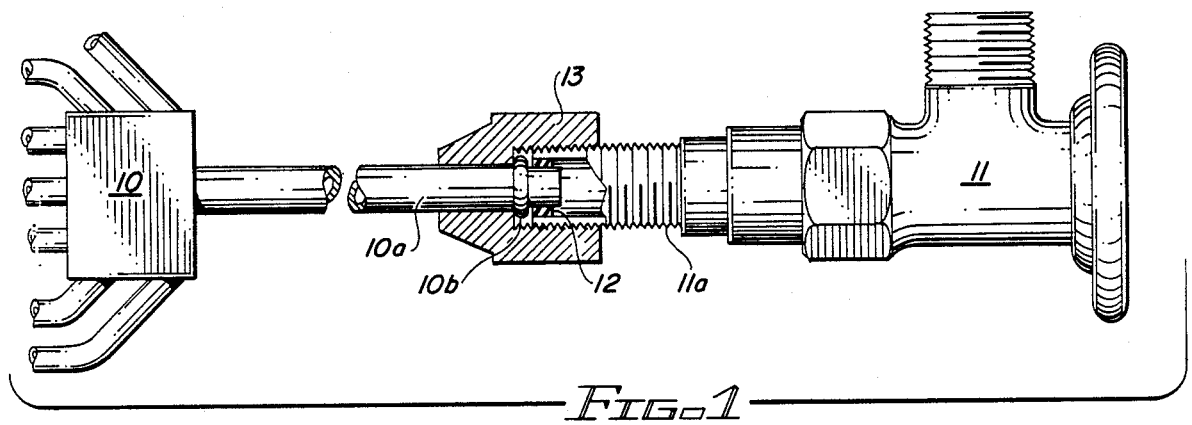
FIG. 1 is an elevational view partially broken away and in cross-section of a conventional coupling of an air conditioner cooling coil and its associated expansion valve using a steel coupling nut irremovably joined to the cooling coil.

Referring to FIG. 1 of the drawings, a conventional assembly coupling an automobile air conditioning cooling coil 10 to its associated expansion valve 11 includes a cooling coil pipe 10a having near its end an annular flange 10b and a gasket 12 preferably of resistive plastic material surrounding the end of pipe 10a. The male threaded end of expansion valve pipe 11a passes over gasket 12 and the end of pipe 11a is snuggly pressed against the flange 10b of the cooling coil pipe by tightening coupling nut 13.

Nut 13 is conventionally made of steel or other ferrous metal alloy. The nut is irremovably joined to cooling coil 10 due to the fact that nut 13 cannot pass over pipe flange 10b. When the air conditioning unit is first assembled in an automobile, the assembly as shown in FIG. 1 provides a leak-proof coupling between the cooling coil 10 and expansion valve 11.

Normal operation of the air conditioning unit subjects the coupling between the cooling coil and its expansion valve to intermitant periods of extreme cold causing condensation of water and often formation of ice on the steel coupling nut 13. Repeated periods of freezing and drying results in corrosion or rusting of the threads and other surfaces of the coupling nut ultimately resulting in a connection which is no longer leak-proof. As a result the air conditioning system begins to lose pressure and the system finally fails. Up to now, so far as I am aware, the only method of repairing the system requires the disconnection of the entire cooling coil assembly 10 and its permanently connected nut 13 and their replacement by a new coil assembly and coupling nut. This conventional repair involves several man hours of labor and use of expensive parts. The cost to the auto owner is several hundred dollars.

My method of repairing the aforesaid air conditioning system uses a unique clamp-on coupling nut to replace nut 13 of the original assembly. FIGS. 2 through 5 of the drawings illustrate the features and use of my new nut, which consists of two mirror-image halves 14 and 15 which in use are clamped together by two Allen head screws 16 and 17. As perhaps best illustrated in FIG. 3, each nut half 14 and 15 has a main body portion preferably rectangular in cross section with a flat front face and a smaller shank portion 14d and 15d respectively projecting from the rear face of the main body of each nut half.

Figure 2:
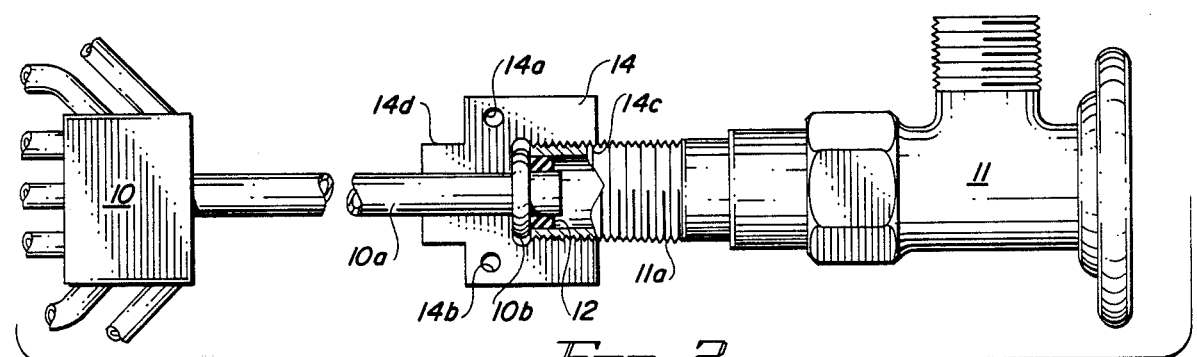
FIG. 2 is an elevational view of the same cooling coil and expansion valve shown in FIG. 1 but now being coupled by my unique clamp-on coupling nut.
Figure 3:
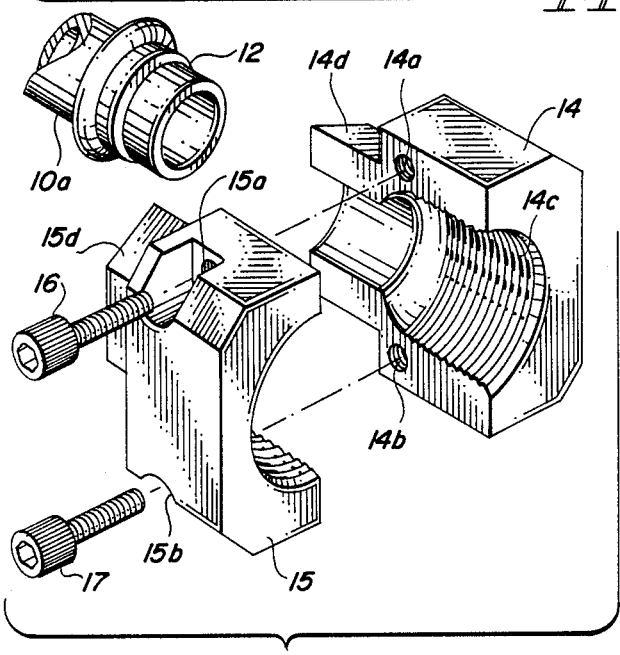
FIG. 3 is an exploded perspective view of my clamp-on coupling nut and the end of its associated cooling coil pipe.
Figure 4:
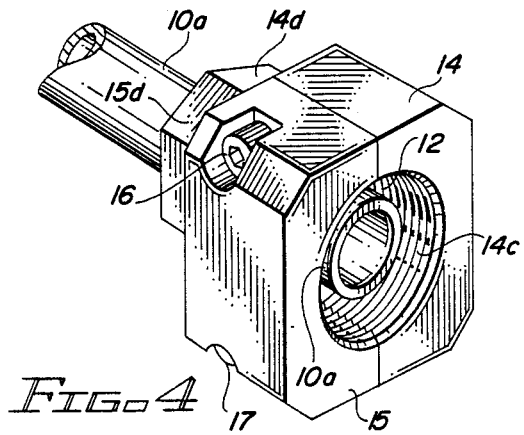
FIG. 4 is a perspective front view of the two halves of my coupling nut assembled around the end of a cooling coil pipe.
Figure 5:
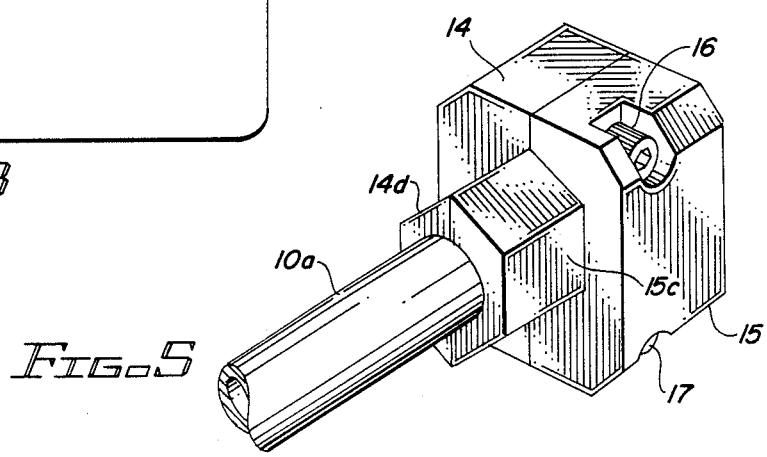
FIG. 5 is a perspective rear view of the assembled nut shown in FIG. 4.

The nut is initially manufactured as a solid undivided unit, the main body portion being generally square in cross section and the projecting shank 15d, 14d being hexagonal in cross section. The nut is then machined (drilled, bored and threaded) to provide a pair of threaded holes 15a, 14a and 15b, 14b on opposite sides of the main body of the nut and also a passageway running axially through the nut perpendicular to holes 15a, 14a and 15b, 14b. The diameter of that portion of the passageway passing through the shank of the nut has a diameter equal to that of the cooling coil pipe 10a. The opposite end of the passageway 14c has a larger diameter and is threaded to receive the threaded end of the expansion valve pipe 11a as best shown in FIGS. 2 and 4. The joinder between the two portions of the passageway of different diameters is smoothly curved to fit snugly against the annular surface of pipe flange 10b as best shown in FIGS. 2 and 3.

After the nut is machined as above described, it is sawed in half along a plane passing through the axis of the passageway through the nut, thereby forming nut halves 14 and 15.

To repair an original coupling which is leaking, original coupling nut 13 as shown in FIG. 1 is unscrewed and removed as by cutting, pipes 10a and 11a are cleaned and dried and a new gasket 12 is installed on the end of pipe 10a. The end of pipe 11a is then fitted over gasket 12 and butted against flange 10b.

One of nut halves 14 and 15 is then placed around the assembled pipes as shown in FIG. 2 and then the other nut half is clamped onto the assembly and secured in place by screws 16 and 17. Leak-proof joinder of pipes 10a and 11a can be further assured by using a wrench or other tool on the hexagonal shank of the assembled nut to press the end of pipe 11a against flange 10b.

Repair of an automobile air conditioning unit as herein described has proven entirely satisfactory in operation of the vehicle for several months in an area of high humidity and heat. The cost of such repair was less than one hundred dollars and only a fraction of the conventional method of repair.

While a preferred embodiment of my invention has been shown and described, some modifications and changes may be made without departing from the spirit of my invention, whose scope is in no way limited by the foregoing description and which is defined only by the appended claims.

I claim:

1. A method of axially coupling together a first pipe having a flange closely adjacent to its end and a second externally threaded pipe whose end buts against the flange of the first pipe and whose internal diameter slightly exceeds the outer diameter of the end of the first pipe extending beyond its flange comprising axially aligning the ends of the first and second pipes with the end of the second pipe encircling the end of the first pipe and abutting against the flange of the first pipe, placing the two mirror-image halves of an axially split coupling nut around the ends of the two pipes, said two halves each having a semi-circular recess sized to fit snugly around one half of the two axially aligned pipe ends and including a female threaded portion of each recess which mates with the threaded end of the second pipe, and clamping together said two nut halves solely by means of two screws threaded into two aligned holes in each of the nut halves, said aligned holes lying on opposite sides of the semi-circular recesses in the two nut halves.

* * * * *